(12) United States Patent
Haggerty et al.

(10) Patent No.: US 8,069,668 B2
(45) Date of Patent: Dec. 6, 2011

(54) METHOD AND SYSTEM FOR AUTONOMOUS LOAD SHARING

(75) Inventors: Sean Haggerty, North Haven, CT (US); Guy Hatch, Vernon, CT (US); Sanh Quang Phan, Southington, CT (US)

(73) Assignee: On Site Gas Systems, Inc., Newington, CT (US)

( * ) Notice: Subject to any disclaimer, the term of this patent is extended or adjusted under 35 U.S.C. 154(b) by 444 days.

(21) Appl. No.: 12/356,128

(22) Filed: Jan. 20, 2009

(65) Prior Publication Data

US 2010/0180596 A1    Jul. 22, 2010

(51) Int. Cl.
*F01B 21/04* (2006.01)
(52) U.S. Cl. .................. 60/711; 60/716; 60/718
(58) Field of Classification Search .......... 60/711, 60/716–718
See application file for complete search history.

(56) References Cited

U.S. PATENT DOCUMENTS

| | | | | |
|---|---|---|---|---|
| 2,672,732 A | * | 3/1954 | Smith et al. | 60/662 |
| 4,001,597 A | * | 1/1977 | Graff | 290/53 |
| 4,412,422 A | * | 11/1983 | Rossi | 60/706 |
| 4,534,169 A | * | 8/1985 | Hunt | 60/414 |
| 4,693,730 A | | 9/1987 | Miller et al. | |
| 4,702,082 A | | 10/1987 | Kobelt | |
| 5,649,995 A | | 7/1997 | Gast, Jr. | |
| 6,193,785 B1 | | 2/2001 | Huf | |
| 6,235,087 B1 | | 5/2001 | Chevalier et al. | |
| 6,270,556 B1 | | 8/2001 | Rouge et al. | |
| 7,032,385 B2 | * | 4/2006 | Gray, Jr. | 60/716 |

FOREIGN PATENT DOCUMENTS

WO    2005045862 A1    5/2005

* cited by examiner

*Primary Examiner* — Hoang Nguyen
(74) *Attorney, Agent, or Firm* — Michaud-Kinney Group LLP

(57) ABSTRACT

A method of autonomously sharing a load between at least two output generation devices, the method including: providing at least two output generation devices, wherein the at least two output generation devices operate autonomously with respect to one another and the at least two output generation devices are in fluid communication with output receiving means adapted to receive output generated by the at least two output generation devices; monitoring output generated by the output generation devices; and cycling each of the at least two devices through an activated mode and a standby mode independently of one another in an automated manner to meet an output demand thereby sharing a load demand between the at least two output generation devices.

20 Claims, 7 Drawing Sheets

| FIG.5A | FIG.5B |

METHOD AND SYSTEM FOR AUTONOMOUS LOAD SHARING

BACKGROUND

1. Technical Field

The disclosed subject matter generally relates to a method and system for autonomous load sharing. Particularly, the disclosed subject matter relates to a method and system of controlling at least two devices to generate output commensurate with demand without direct communication between the devices.

2. Related Art

In general, systems utilizing multiple devices to supply output commensurate with demand communicate with one another to facilitate the generation of the demanded output. To accomplish this, multiple devices are often used and communicate with one another via physical connection, such as, wires, computers, control panels, conduits, and the like. Such physical connections require the devices to either be located near one another, or the wires, conduits and the like must be long enough to provide the physical connection between the devices. Lengthy connection or communication means may be costly, difficult to install and/or difficult to maintain. Moreover, in some systems, close physical location of the devices may not be advisable or attainable.

Accordingly, a method and system for autonomous load sharing to control multiple devices supplying output without direct communication between the devices is needed.

SUMMARY

One aspect relates to a method of autonomously sharing a load of output demand between at least two output generation devices, the method comprising: providing at least two output generation devices, wherein the at least two output generation devices operate autonomously with respect to one another and the at least two output generation devices are in fluid communication with output receiving means adapted to receive output generated by the at least two output generation devices; monitoring output generated by the output generation devices and provided to the output receiving means; and cycling each of the at least two devices through an activated mode and a standby mode independently of one another in an automated manner to meet an output demand thereby sharing a load of output demand between the at least two output generation devices.

Another aspect relates to a system for autonomously sharing a load of output demand between at least two output generation devices, the system comprising: at least two output generation devices in fluid communication with an output receiving means, wherein the at least two output generation devices operate autonomously with respect to one another; at least two monitoring and detecting devices, for monitoring and detecting output in the output receiving means, wherein one of the at least two output monitoring and detecting devices is located between one of the at least two output generation devices and the output receiving means; and means for cycling each of the at least two output generation devices between an activated mode and a standby mode independently of one another in an automated manner, wherein the activated mode and the standby mode are dependent on the output of the system.

A further aspect relates to a system for autonomously sharing a load of output demand between at least two output generation devices, the system comprising: at least two output generation devices; wherein the at least two output generation devices operate autonomously with respect to one another; at least two storage systems, each of the at least two storage systems having a predetermined minimum set point and a predetermined maximum set point associated therewith, wherein one of the at least two storage systems is in fluid communication with one of the at least two output generation devices; and an output receiving means in fluid communication with the at least two storage systems, the output receiving means having a predetermined minimum set point and a predetermined maximum set point associated therewith.

These aspects, as well as others, are described in more detail herein.

DETAILED DESCRIPTION

Figure 1:
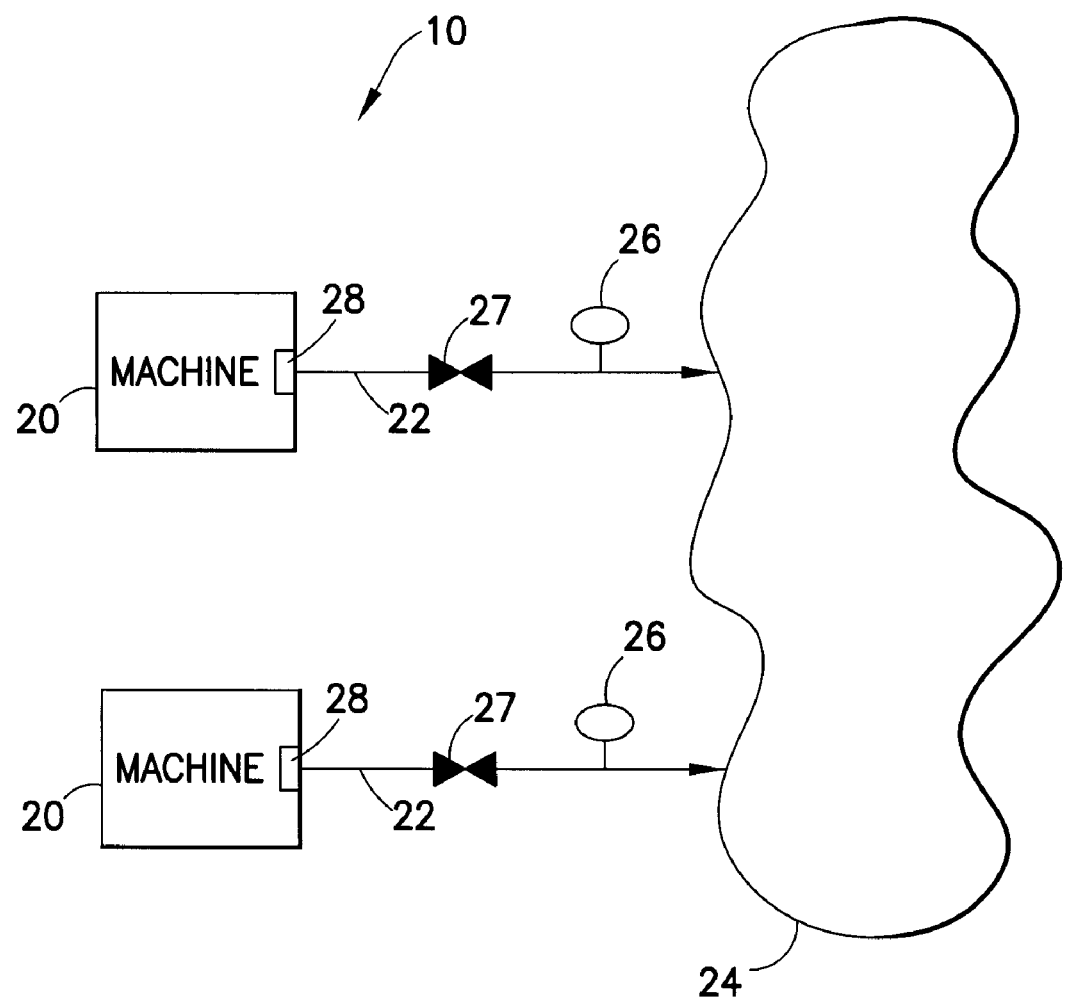
FIG. 1 depicts a system for autonomously sharing a load between at least two output generation devices.

As shown in FIG. 1, a system 10 includes at least two output generation devices 20 which operate autonomously with respect to one another. The expression "operating autonomously with respect to one another" as used herein means that the output generation devices, and the various components associated with each output generation device, are not in direct physical communication with one another and therefore are controlled and operated separately and independently from one another. While only two output generation devices 20 are illustrated in FIG. 1, it is contemplated that an infinite number of output generation devices may be utilized in system 10. It is contemplated that the output generation devices may or may not be uniform with respect to their model, type, size or output generation.

Output generation devices 20 may be any device capable of generating an output 22 that can meet an output demand of system 10. Output generation devices 20 used in system 10 may be different from one another, i.e., be different in size, be able to generate different amounts or loads of output, etc. Output generation devices 20 may share the load required to generate output 22 demanded by system 10 to meet the output demand either in whole or in part. As used herein, the term "load" refers to the work or the burden required by output generation devices 20 required to meet the output demand of system 10. As used herein the term "output demand" refers to an amount of whatever the output generation devices 20 produce and that is required or requested by system 10, i.e., required or requested by the end user of the system or required by the application in which the system is employed.

The type of output generation devices 20 vary based on system 10 and the type of output 22 that is demanded by the system. For example, output generation devices 20 may be a gas generation device, such as a pressure swing adsorption (PSA) system or a membrane gas generation device. Output generation devices 20 may also include, but are not limited to an electrical generator, a well pump, or bottled gas cylinders.

Output 22 may be any product, energy or service or demanded by system 10 or the application in which the system is employed. Output 22 is dependent upon the type of output generation device 20 employed in system 10. Examples of output 22 include, but are not limited to electricity (voltage), gas (nitrogen, oxygen, ammonia, etc.), water, or any other type of material, energy or service capable of being produced by output generation device 20.

Output generation devices 20 are in communication with an output receiving means 24. Output receiving means 24 may be any means capable of, or adaptable to, receive output 22 generated by output generation devices 20. Output receiving means 24 will vary depending on output 22 generated by output generation devices 20. For example, output receiving means 24 includes, but is not limited to, a conduit, a container such as a bottle, a generator, a battery, a wire, a power station or power plant, a pipeline, a water supply station, a room in a building, or the like.

The flow or transfer of output 22 to output receiving means 24 is facilitated by a valve 27 or other type of control such as, but not limited to, a switch or relay. The means for facilitating the flow of output 22 is dependent on the type of output.

System 10 includes at least two monitoring and detecting devices 26, where one of the monitoring and detecting devices is in fluid communication with one of the output generation devices 20. Monitoring and detecting device 26 is located between each output generation device 20 and output receiving means 24. Monitoring and detecting devices 26 monitor the need for output, or the amount of output needed, in output receiving means 24. The term "amount" as used herein means a quantity and encompasses any way to measure the quantity, i.e., by mass, by weight, by volume, by area, and the like. Monitoring and detecting devices 26 may be any device or apparatus with the ability to monitor output 22 in output receiving means 24, and includes, but is not limited to a sensor, a transducer, a pressure transducer and a flow meter.

It is contemplated that monitoring and detecting devices 26 periodically check output 22 in output receiving means 24. Monitoring the output demand of system 10 may be performed on a particular schedule, or it may be performed at timed intervals, such as every minute or every half hour, or any other manner suited to the particular application of system 10.

Typically, the output demand required by system 10 is determined on a case-by-case basis and will also vary depending on the particular application in which the system is employed. As one of ordinary skill in the art will appreciate, the output demand varies depending on several factors, including, but not limited to, the demands of the ultimate end-user of system 10, the location of the system and the situation in which the system is employed. The amount of output 22 required by system 10 may be determined by an end user and that amount may vary from time to time and therefore may be changed as desired by the end user.

System 10 also includes a monitoring and cycling means 28 in fluid communication with each output generation device 20. Monitoring and cycling means 28 fulfills several functions, including, but not limited to monitoring the output 22 required by system 10 and cycling each output generation device 20 between an activated mode and a standby mode. Monitoring and cycling means 28 may be any device or apparatus in fluid communication with output generation device 20 that is capable of activating an output generation device.

Monitoring and cycling means 28 may employ a timer that is programmed to periodically monitor output 22 required by system 10. Monitoring and cycling means 28 can be programmed to check output 22 required by system 10 at certain designated times, or it can be set to randomly check the output required by the system. Monitoring and cycling means 28 may include, but is not limited to a sensor, a power switch, a transducer, or a machine process cycle or time cycle in output generation device 20.

The cycling of output generation devices 20 between an activated mode and a standby mode enables the output generation devices to share the load and meet the output demand of system 10. As used herein, the term "activated" means that an output generation device 20 is turned on or is generating output 22. The term "standby," as used herein, means an output generating device 20 is turned off or is not generating output 22.

The cycling of output generation devices 20 between an activated mode and a standby mode is regulated or determined by several predetermined set points associated with the output 22 in system 10. In one example, system 10 has more than one predetermined set point associated with the output 22 of the system. The predetermined set points may be selected by the end user of system 10 and will vary based on the application of system 10. In one instance, the predetermined set points include a predetermined minimum set point associated with the output in output receiving means 24, a predetermined intermediate set point associated with the output in the output receiving means and a predetermined maximum set point associated with the output in the output receiving means. It is contemplated that more or less set points can be used for a given application or system 10. Additionally, it is contemplated that the number of set points may be changed throughout the life of system 10.

In one example, a predetermined minimum set point is established to signal to output generating devices 20 that output 22 generated by the output generation devices does not meet the output demand of system 10. Similarly, a predetermined intermediate set point is established to signal to output generation devices 20 that output 22 generated by the output generation devices does not meet the output demand of system 10. A predetermined maximum set point is established to signal to output generation devices 20 that output 22 generated by the output generation devices meets the output demand of system 10.

Periodic monitoring of output 22 generated by output generation devices 20 by monitoring and detecting devices 26, as well as monitoring and cycling means 28, determines if the system has reached a predetermined set point. It is contemplated that each monitoring and detecting device 26 and monitoring and cycling means 28 in fluid communication with the different output generation devices 20 in system 10 monitors output 22 at different intervals or schedules to prevent the activation of all output generation devices at the same time. Different monitoring intervals or schedules facilitate sharing the load between output generation devices 20.

Figure 2:
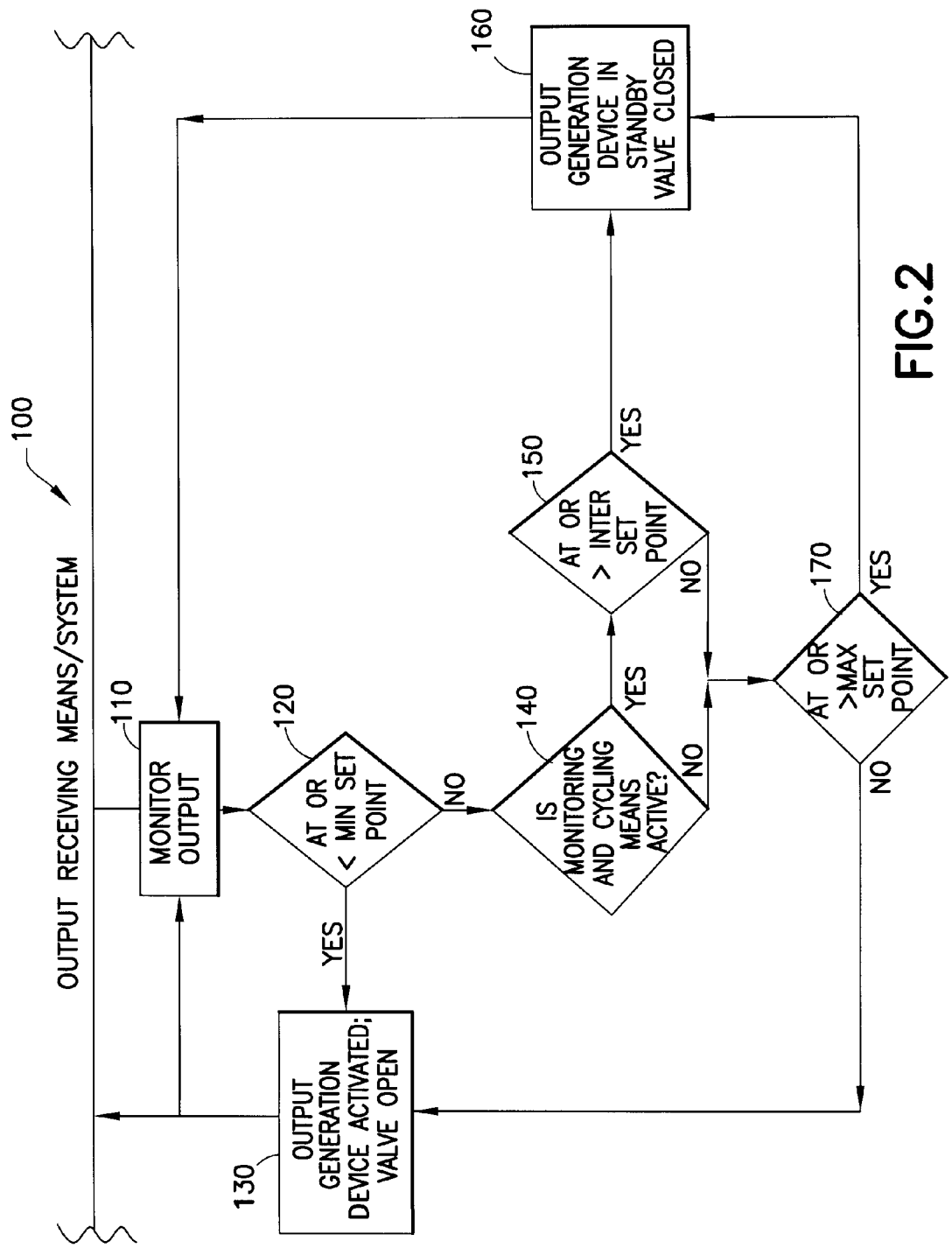
FIG. 2 is a flowchart illustrating a method for autonomously sharing a load between at least two devices.

A process of sharing the output load between output generation devices 20 of system 10 is illustrated in process 100 of FIG. 2. Typically, as shown in block 110, the amount of output 22 in output receiving means 24 is monitored by monitoring and detecting device 26 as well as monitoring and cycling means 28. Process 100 proceeds to block 120. In block 120, if the amount of output 22 in output receiving means 24 is detected to be at or below a predetermined minimum set point, then the activated mode of the output generation device 20 is initiated or maintained and valve 27 is open as shown by block 130.

In block 120, if an amount of output 22 in output receiving means 24 is not at or less than a predetermined minimum set point, i.e., the amount of output is greater than the predetermined minimum set point, then process 100 proceeds to block 140. In block 140, it is determined whether monitoring and cycling means 28 is active. If it is, process 100 moves to block 150 to determine if the amount of output 22 in output receiving means 24 is at or greater than the predetermined intermediate set point. If the amount of output 22 is at or greater than the predetermined intermediate set point, then the standby mode of output generation device 20 is initiated or maintained as shown by block 160. If, at block 150, the amount of output 22 is detected to not be at or greater than the intermediate set point, i.e., the amount of output is less than the predetermined intermediate set point, and the monitoring and cycling means 28 is active, then the process proceeds to block 170.

At block 170, if the amount of output 22 is at or greater than the maximum predetermined set point, process 100 continues to block 160, and the standby mode of output generation means 20 is initiated or maintained and valve 27 is closed. Alternatively, if output 22 is not at or greater than a predetermined maximum set point in block 170 then process 100 proceeds to block 130, output generation device 20 is activated or is maintained in an activated mode and valve 27 is open to allow output 22 to flow or move into output receiving means 24.

Referring back to block 140, if monitoring and cycling means 28 is not active, and output 22 is at or greater than a predetermined maximum set point at block 170, output generation device 20 is placed or kept in standby mode and valve 27 is closed, as shown in step 160. If however, at block 140, monitoring and cycling means 28 is not active and output 22 is not at or greater than a predetermined maximum set point at block 170, then process 100 proceeds to step 130, and the output generation device 20 is activated or maintained in an activated state and valve 27 is open, and process 100 proceeds to step 110, where the output is monitored.

In process 100 of FIG. 2, system 10 is periodically monitored to determine whether an output generation device 20 should be in an activated mode or a standby mode. Process 100 is a continuous loop carried out by each output generation device 20. Since it is contemplated that each output generation device 20 periodically monitors output 22 of system 10, and the monitoring schedule of each output generation device within the system is different, this process allows the load to be shared between all the output generation devices of the system without direct communication between the devices.

Figure 3:
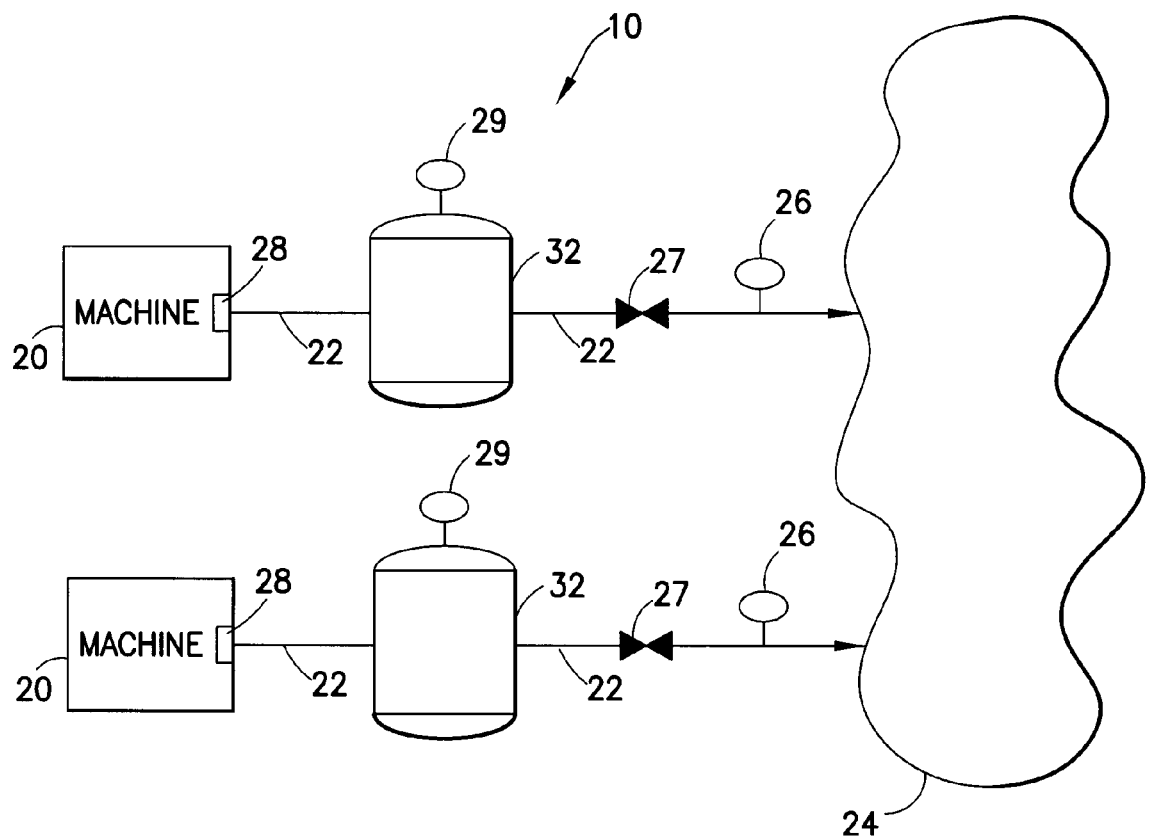
FIG. 3 depicts a system for autonomously sharing a load between at least two output generation devices.

As shown in FIG. 3, in another embodiment, output generation devices 20 are in indirect fluid communication with output receiving means 24 by placement of a storage system 32 between each output generation device and the output receiving means.

Referring to FIG. 3, wherein like numerals note like parts, storage system 32 may be any system adaptable to receive and store output 22 from output generation devices 20 and subsequently release the output to output receiving means 24. Storage system 32 may be employed to facilitate the immediate supply of output 22 into output receiving means 24. For example, there may be an instance where system 10 demands more output 22, but output generation device 20 is not in an activated mode and therefore not generating output. In order to supply output 22 to system 10 during the time it takes for output generation devices 20 to be activated and generate output, storage system 32 may supply the demanded output to the system.

Still referring to FIG. 3, release of output 22 by storage system 32 may be performed immediately after the output enters the storage system, or, alternatively, the output may be stored in the storage system and then released via a valve 27 or other actuator device when output is demanded by system 10. For example, if the output demand of system 10 is not met, at least one of output generation devices 20 is in an activated mode and generates output 22, which will pass through storage system 32 and proceed to output receiving means 24 without being stored in the storage system. Whenever output generation device 20 is in an activated mode, valve 27 is open to allow the flow of output 22 to output receiving means 24. Alternatively, output 22 may be generated and stored in storage system 32 for a period of time if the output demand of system 10 is met. Output 22 will be released from storage system 32 to output receiving means 24 if the output demand of system 10 is not met.

The activated mode and standby mode of output generation devices 20 may be initiated or maintained by several mechanisms when storage system 32 is utilized in system 10. In one embodiment, output generation devices 20 are in activated or standby mode based on an amount of output 22 in output receiving means 24. When output 22 in output receiving means 24 is below or at a predetermined minimum set point, valve 27 opens and the output stored in the storage system is released to the output receiving means thereby eventually decreasing or depleting the amount of output in the storage system, and thereby activating the output generation device 24 that is in fluid communication with the storage system. When an amount of output 22 in output receiving means 24 is at or above a maximum set point in output generation means 24, valve 27 closes and the output remains in storage system 32.

In another embodiment, the activated mode and standby mode of output generation devices 20 may be initiated or maintained by monitoring and detecting predetermined set points associated with the amount of output 22 stored in storage system 32. Storage systems 32 have at least two predetermined set points associated with the amount of output 22 stored in the storage systems. In one example, storage systems 32 have a predetermined minimum set point and a predetermined maximum set point. A monitoring and detecting means 26 is in fluid communication with one of the storage systems 32. Output generation device 20 is activated by monitoring and cycling means 28 when monitoring and detecting means 29 in fluid communication with storage system 32 detects an amount of output 22 that is at or below a predetermined minimum set point. If monitoring and detecting means 29 in fluid communication with storage system 32 detects an amount of output 22 that is at or above a predetermined maximum set point, output generation device 20 is placed or maintained in standby mode. It is noted that, when output generating device 20 is generating output 22 to fill storage system 32, valve 27 remains open to allow output to flow to output receiving means 24, which allows other output generating devices to turn off and go into standby mode.

In most instances, when system 10 employs storage system 32, output generation devices 20 are placed or maintained in an activated or standby mode by virtue of a combination of the above, i.e., the predetermined set points of storage system 32 and the predetermined set points of output receiving means 24. For example, if an amount of output 22 in output receiving means 24 is at or below the minimum set point, valve 27 will open to release output stored in storage system 32. Eventually, the amount of output 22 in storage system 32 will be at or below the predetermined minimum set point of the storage system and output generation device 20 will be in an activated mode.

Figure 4:
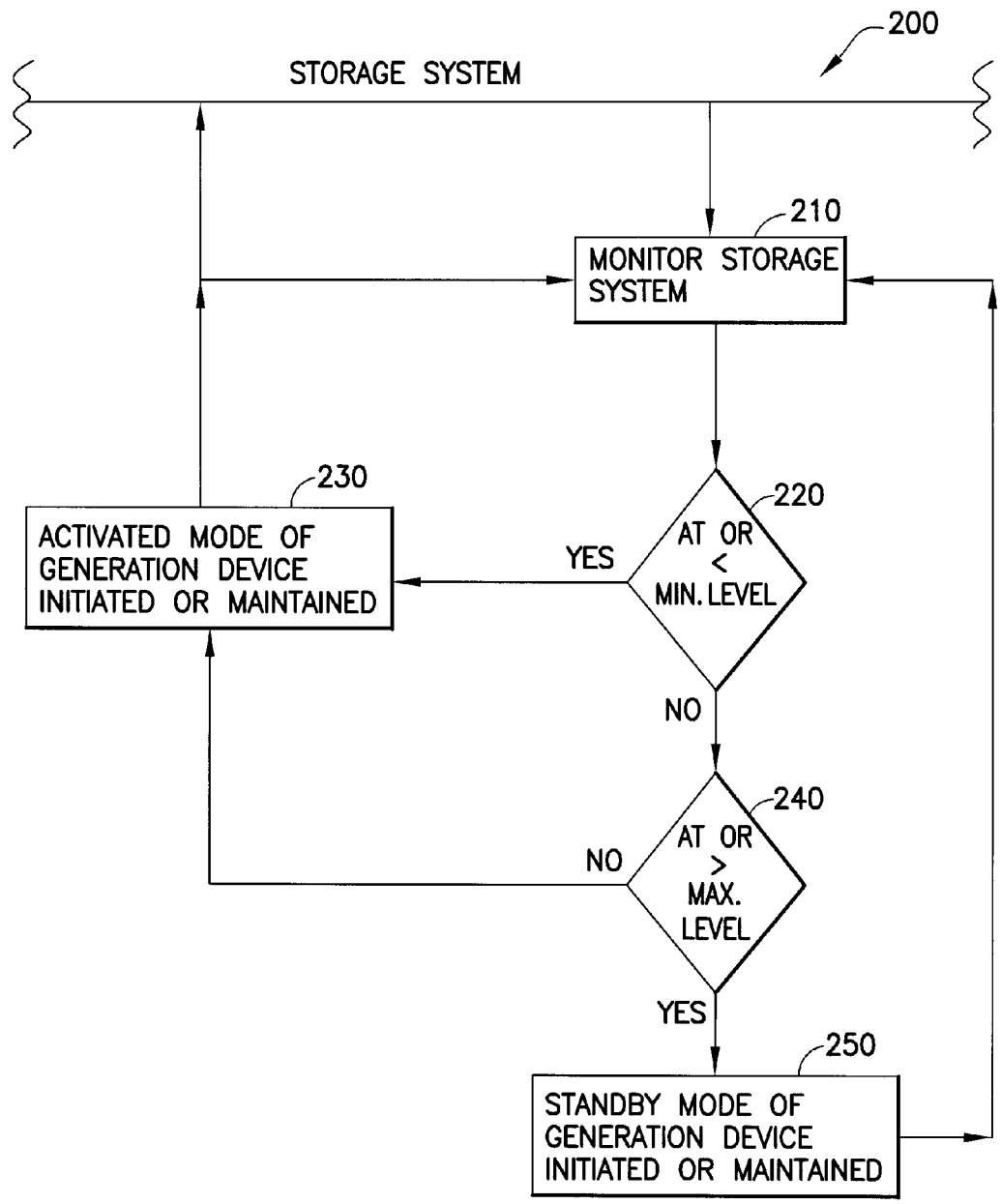
FIG. 4 is a flowchart illustrating a method of supplying output to a storage system.

The process shown in the flowchart of FIG. 4 illustrates the cycling of one output generation device 20 through activated and standby modes depending on the amount of output 22 in storage system 32.

In a process 200, an amount of output 22 in storage system 32 is monitored in block 210. Monitoring of output 22 in storage system 32 is performed by monitoring and detecting device 26 in fluid communication with the storage system. In block 220, if an amount of output 22 in storage system 32 is at or below a predetermined minimum set point, then the activated mode of the output generation device 20 in fluid communication with the storage system is initiated or maintained as shown in block 230. In block 220, if the amount of output 22 in storage system 32 is not at or less than a predetermined set point, i.e., the amount is greater than the predetermined minimum set point, then process 200 proceeds to block 240.

In block 240, if the amount of output 22 in storage system 32 is at or greater than the predetermined maximum set point, then the standby mode of the associated gas generation device 20 is initiated or maintained as shown in block 250. In block 240, if the amount of output 22 in storage system 32 is not greater than the predetermined maximum set point, then the activated mode of output generation device 20 in fluid communication with the storage system is initiated or maintained as shown in block 230.

In process 200 of FIG. 4, the system is periodically monitoring and detecting an amount of output 22 in storage system 32 to determine whether an output generation device 20 should be in an activated mode or a standby mode. Process 200 is a continuous loop that facilitates the maintenance of an amount of output 22 in storage system 32.

Figure 4A:
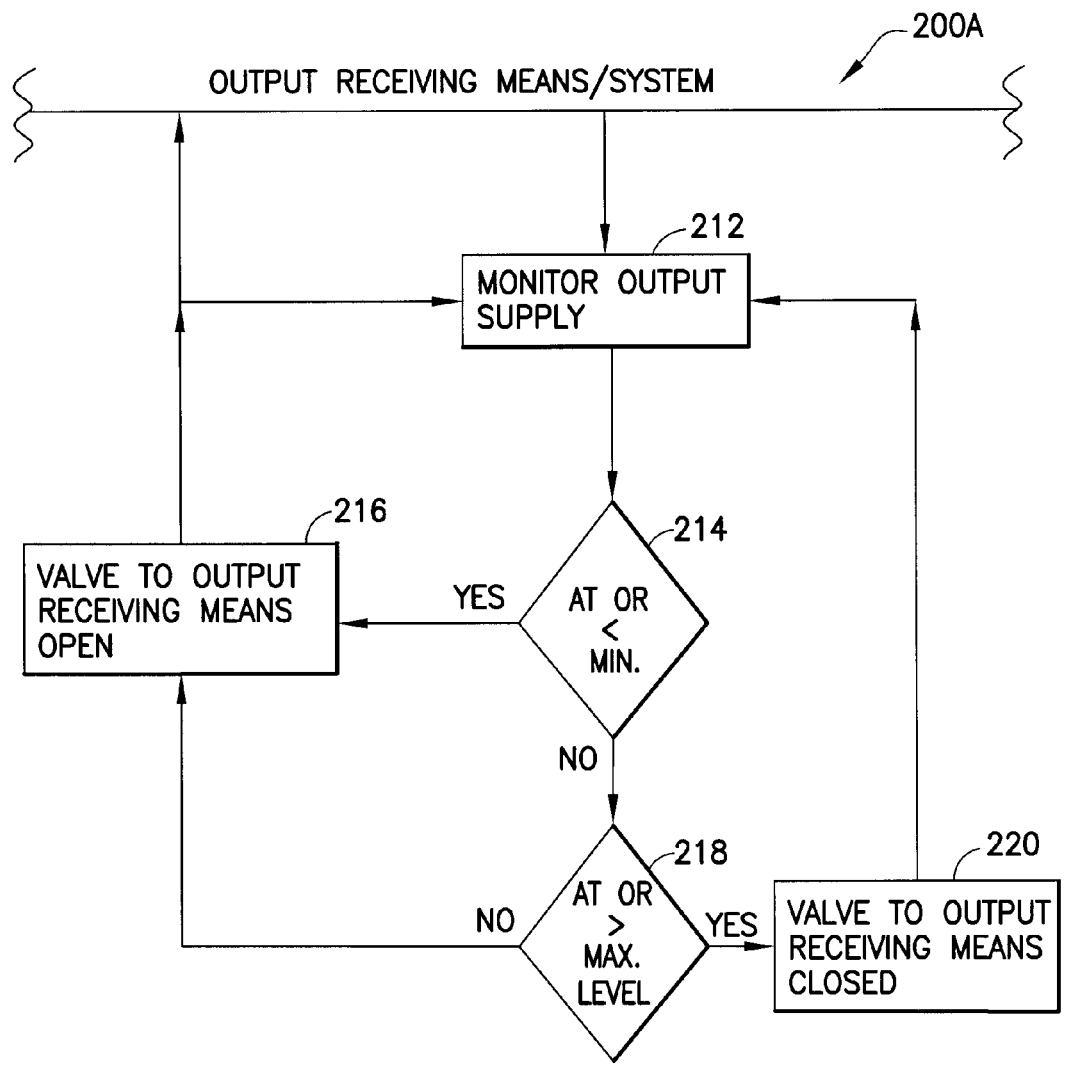
FIG. 4A is a flowchart illustrating a method of supplying output to a system which utilizes a storage system.

FIG. 4A illustrates a process 200A, which initiates or maintains an activated or standby mode of output generation device 20. Typically, process 200A is used in conjunction with process 200 when system 10 utilizes storage system 32, however, it is contemplated that process 200A can be employed even if system 10 does not utilize storage system 32. Process 200A monitors an amount of output 22 in output receiving means 24 in block 212. Monitoring of output 22 in output receiving means 24 is performed by monitoring and detecting device 26. If the amount of output 22 in output receiving means 24 is at or below a predetermined minimum set point at block 214, process 200A continues to block 216, where the valve that allows output 22 to flow into output receiving means 24, is open. In block 212, if an amount of output 22 in output receiving means 24 is not at or less than a predetermined minimum set point, i.e., greater than the predetermined minimum set point, process 200A moves to block 218, where it is determined whether the amount of output in the output receiving means is at greater than a predetermined maximum set point. If output 22 is at or greater than a predetermined maximum set point, then the valve that allows the output to flow into output receiving means 24 is closed, as shown in block 220. However, if in block 218 the amount of output 22 is below the predetermined maximum set point, process 200A proceeds to block 216, where the valve that allows output 22 to flow into output receiving means 24 is open.

In process 200A of FIG. 4A, the system is periodically monitoring and detecting an amount of output 22 in output receiving means 24 to determine whether the valve that allows the output into output receiving means 24 is open or closed. Process 200A is a continuous loop that facilitates the maintenance of an amount of output 22 in output receiving means 24.

Figures 5, 5A:
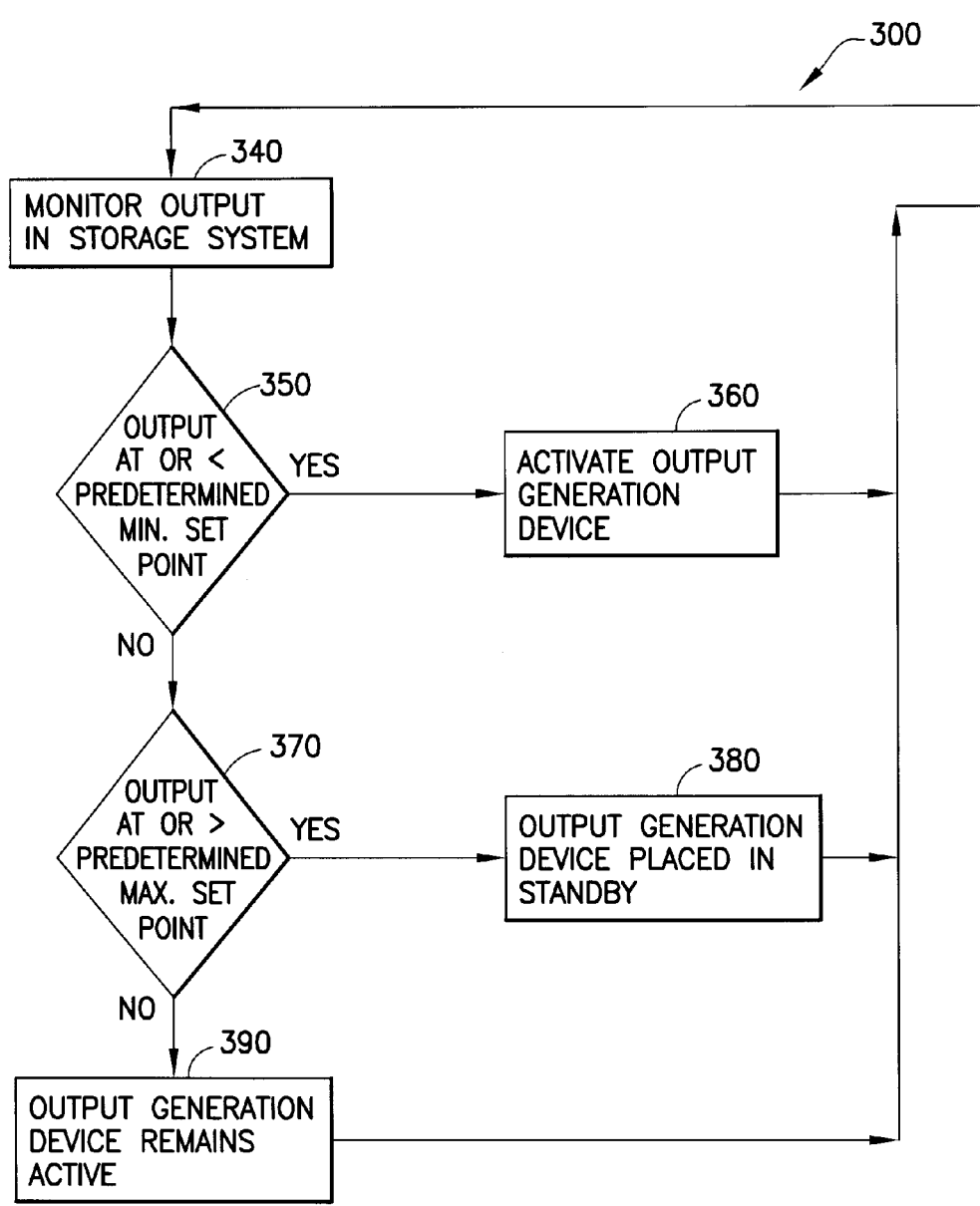
FIG. 5 is a flowchart illustrating a method of supplying output to a system, which utilizes a storage system.
Figure 5B:
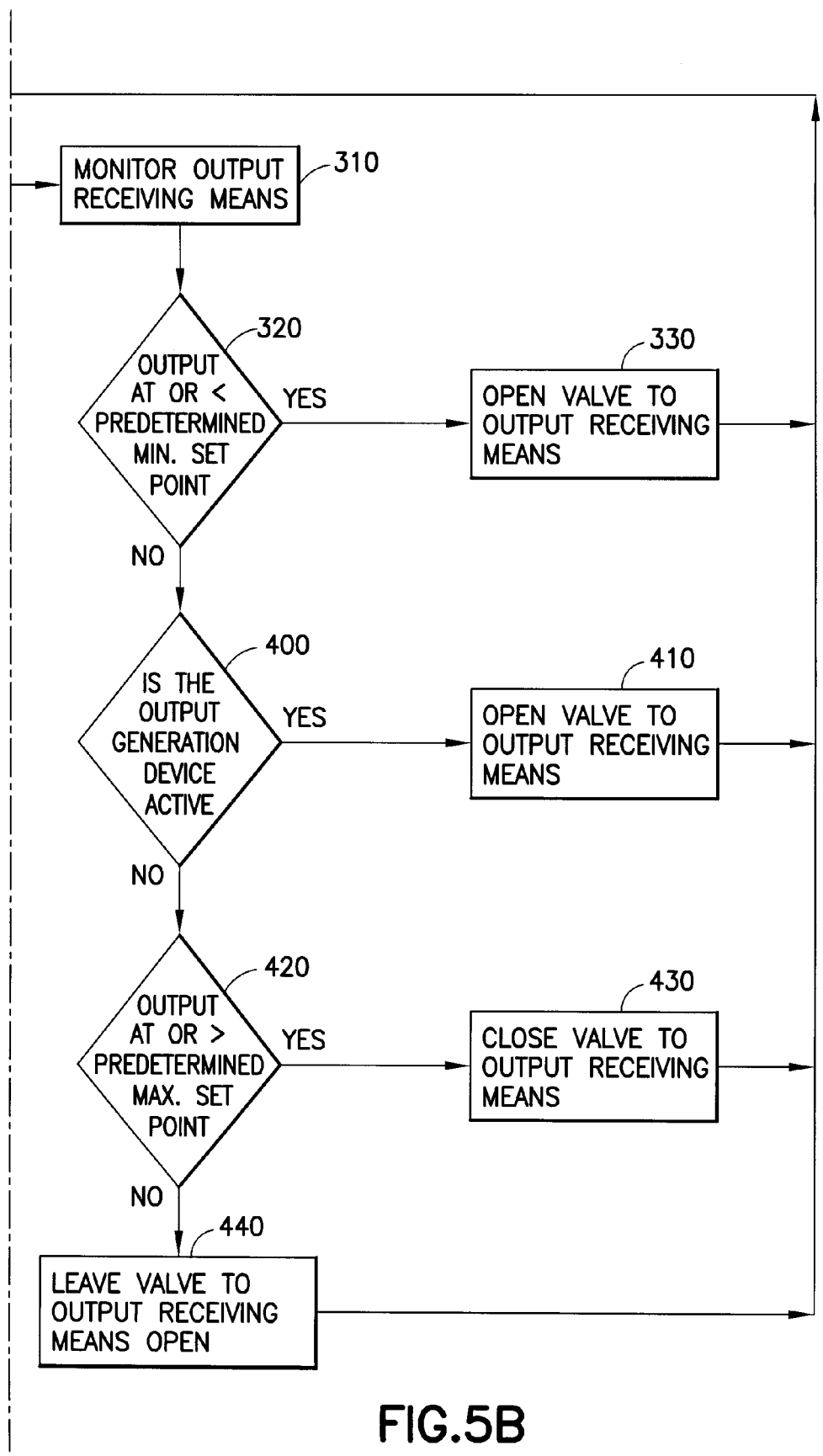

FIG. 5 illustrates process 300, which is a combination of processes 200 and 200A when used in system 10 that employs storage system 32. In block 310, the amount of output 22 in output receiving means 24 is monitored by monitoring and detecting device 26. If the amount of output 22 is at or below a predetermined minimum set point as shown in block 320, then the valve that allows the flow of the output to output receiving means 24 is open as shown in block 330. Once the valve to output receiving means 24 is open in block 330, process 300 proceeds to block 340, where an amount of output 22 in storage system 32 is monitored. In block 350, if the amount of output 22 in storage system 32 is at or below a minimum set point, then process 300 moves to box 360, where the activated mode of generation device 20 is initiated or maintained. Alternatively, if at block 350 the amount of output 22 in storage system 32 is not at or below the predetermined minimum set point, then process 300 proceeds to block 370 where it is determined if the amount of output in the storage system is at or greater than the predetermined maximum set point. If the amount of output 22 in the storage system 32 is at or greater than the predetermined maximum set point process 300 proceeds to box 380 where the standby mode of output generation device 20 in fluid communication with storage system 32 is initiated or maintained. If output 22 in storage system 32 is determined to not be at or greater than a predetermined maximum set point at box 370. Then process 300 proceeds to box 390 where the activated mode of the output generation device 20 in fluid communication with the storage system is initiated or maintained.

A shown in FIG. 5, there is continuous monitoring of the output 22 in storage system 32 as well as continuous monitoring of output 22 in output receiving means 24.

Going back to block 320, if output 22 in output receiving means 24 is not at or below a predetermined minimum set point, then process 300 proceeds to block 400 where it is determined whether the output generation device 20 is in an activated mode. If the output generation device 20 is in an activated mode, process 300 proceeds to block 410 where the valve to output receiving means 24 is maintained in an open position or is placed in an open position. Whenever output generation device 20 is in an activated mode, the valve allowing the output to proceed to output receiving means 24 should be in an open position. Output 22 in output receiving means 24 is periodically monitored to determine whether the valve that allows the output to flow to the output receiving means should be open or closed.

If, at block 400, it is determined that the output generation device 20 is not active, then process 300 proceeds to block 420, where it is determined whether output 22 present in the output receiving means 24 is at or above the predetermined maximum set point. If the output receiving means 24 is at or above the predetermined maximum set point, the valve to output receiving means 24 is closed as shown in block 430. If, however, the output 22 in output receiving means 24 is not at or above the predetermined maximum set point, process 300 proceeds to block 440, which indicates the valve to the output receiving means 24 is maintained or placed in an open position.

Cycling output generation devices 20 through activated and standby modes independently of one another allows remote placement of the output generation devices with respect to one another. Remote placement of output generation devices 20 facilitates utilization of several output generation devices in connection with a large area or system that requires output 22.

A specific example of system 10 includes a gas generation supply system that produces a desired output of gas deliverable to a particular location. Gas generation supply systems are employed in a variety of systems and locations such as hospitals, emergency medical service vehicles, vehicles utilized in military situations, mines, and the like.

It is contemplated that an infinite number of gas generation devices may be utilized in a gas generation supply system. In one example, the gas generation devices are pressure swing adsorption (PSA) systems, which are adapted to separate a component gas from a multicomponent gas stream, such as the separate of nitrogen from ambient air. PSA systems may generate oxygen or nitrogen as the desired gas. Alternatively, the gas generation devices may be a nitrogen membrane generation device.

The gas generation devices are in fluid communication with a gas receiving means. Gas receiving means may be any clearly characterized area or section adapted to receive a gas released from the gas generation device. Examples of gas receiving means may include, but are not limited to a pipe, duct, channel or other conduit or system of conduits adapted to carry and distribute the gas, a mine, a storage system as described herein, a room, a corridor, or the like.

The gas generation devices operate autonomously with respect to one another. By operating autonomously from one another it is meant that the gas generation devices, and the various components associated with each gas generation device, are not in direct communication with one another and therefore are controlled and operated separately and independently from one another. Accordingly, this allows the gas generation devices to be placed at any location relative to one another to supply gas to the gas receiving means. This may be beneficial if the gas receiving means is a large area that requires several gas generation devices to be positioned at different locations to supply the system with the required output demand of gas.

In one example, the gas receiving means may be one or more conduits or a system of conduits that traverses the length of, or winds throughout, a building. In another example, the gas receiving means may be a mine. Gas generation devices may be placed at any location along the conduit or system of conduits or the mine without being linked or otherwise connected to each other and, by the methods and systems described herein, still generate the amount of gas required by the system.

Pursuant to the system and process described above, the gas generation devices may be in direct or indirect fluid communication with the gas receiving means. It is contemplated that the gas generation devices may be in direct fluid communication with the gas receiving means. However, the gas generation devices may be indirectly in fluid communication with the gas receiving means by placement of a storage system between each gas generation device and the gas receiving means.

Systems employing gas generation devices to supply gas as the output implement the process described above. That is, the gas generation devices are activated or placed in standby mode depending on predetermined set points associated with the output of the system or the predetermined set points associated with the amount of output present in the storage systems.

Although the disclosed subject matter has been shown and described with respect to the detailed embodiments thereof, it will be understood by those of skill in the art that various changes may be made and equivalents may be substituted for elements thereof without departing from the scope of the disclosed subject matter. In addition, modifications may be made to adapt a particular situation or material to the teachings of the subject matter without departing from the essential scope thereof. Therefore, it is intended that the disclosed subject matter not be limited to the particular embodiments disclosed in the above detailed description, but that the disclosed subject matter will include all embodiments falling within the scope of the disclosure.

What is claimed is:

1. A method of autonomously sharing a load of output demand between at least two output generation devices, said method comprising:
    providing at least two output generation devices, wherein said at least two output generation devices operate autonomously with respect to one another and said at least two output generation devices are in fluid communication with output receiving means adapted to receive output generated by said at least two output generation devices;
    monitoring output generated by said output generation devices and provided to the output receiving means; and
    cycling each of said at least two devices through an activated mode and a standby mode independently of one another in an automated manner to meet an output demand thereby sharing a load of output demand between said at least two output generation devices.

2. A method according to claim 1, further comprising:
    setting a predetermined minimum set point associated with said output in said output receiving means;
    setting a predetermined intermediate set point associated said output in said output receiving means; and
    setting a predetermined maximum set point associated with said output in said output receiving means.

3. A method according to claim 2, further comprising:
    initiating or maintaining said activated mode of at least one of said output generation devices by detecting an amount of output in said output receiving means that is at or less than said predetermined minimum set point.

4. A method according to claim 2, further comprising:
    initiating or maintaining said activated mode of at least one of said generation devices by detecting an amount of output in said output receiving means that is at or less than said predetermined intermediate set point.

5. A method according to claim 2, further comprising:
    initiating or maintaining said standby mode of at least one of said generation devices by detecting an amount of output in said output receiving means that is at or greater than said predetermined maximum set point.

6. A method according to claim 1, further comprising:
    supplying at least two storage systems for storing said output prior to introduction of said output to said output receiving means, wherein one of said at least two storage systems is in fluid communication with one of said at least two output generation devices; and
    monitoring an amount of output stored in said storage system.

7. A method according to claim 6, further comprising:
    setting a predetermined minimum set point associated with output in each of said at least two storage systems; and
    setting a predetermined maximum set point associated with output in each of said at least two storage systems.

8. A method according to claim 7, further comprising:
    initiating or maintaining said activated mode of at least one of said output generation devices by detecting said predetermined minimum set point associated with said output in said storage system.

9. A method according to claim 7, further comprising:
    initiating or maintaining said standby mode of at least one of said generation devices by detecting said predetermined maximum set point associated with said output in said storage system.

10. A system for autonomously sharing a load of output demand between at least two output generation devices, said system comprising:
- at least two output generation devices in fluid communication with an output receiving means, wherein said at least two output generation devices operate autonomously with respect to one another;
- at least two monitoring and detecting devices, for monitoring and detecting output in said output receiving means, wherein one of said at least two output monitoring and detecting devices is located between one of said at least two output generation devices and said output receiving means; and
- means for cycling each of said at least two output generation devices between an activated mode and a standby mode independently of one another in an automated manner, wherein said activated mode and said standby mode are dependent on said output of said system.

11. A system according to claim 10, further comprising:
- a predetermined minimum set point associated with said output in said output receiving means;
- a predetermined intermediate set point associated with said output in said output receiving means; and
- a predetermined maximum set point associated with said output in said output receiving means.

12. A system according to claim 10, further comprising:
- at least two storage systems for storing output generated by said at least two output generation devices prior to introduction of said output to said output receiving means, wherein one of said at least two storage systems is in fluid communication with one of said at least two output generation devices and is in fluid communication with said output receiving means.

13. A system according to claim 12, further comprising:
- at least two monitoring and detecting devices for monitoring and detecting output stored in said at least two storage systems wherein one of said at least two monitoring and detecting devices is in fluid communication with one of said at least two storage systems.

14. A system according to claim 13, further comprising:
- a predetermined minimum set point associated with output in each of said at least two storage systems; and
- a predetermined maximum set point associated with output in each of at least two storage systems.

15. A system for autonomously sharing a load of output demand between at least two output generation devices, said system comprising:
- at least two output generation devices; wherein said at least two output generation devices operate autonomously with respect to one another;
- at least two storage systems, each of said at least two storage systems having a predetermined minimum set point and a predetermined maximum set point associated therewith, wherein one of said at least two storage systems is in fluid communication with one of said at least two output generation devices; and
- an output receiving means in fluid communication with said at least two storage systems, said output receiving means having a predetermined minimum set point and a predetermined maximum set point associated therewith.

16. A system according to claim 15, further comprising at least two valves, wherein one of said at least two valves is located between one of said at least two storage systems and said output receiving means.

17. A system according to claim 16, wherein said at least two valves are adapted to open when an amount of output in said output receiving means is at or below said predetermined minimum set point associated with said output receiving means, and said at least two valves are adapted to close when an amount of output in said output receiving means is at or greater than said predetermined maximum set point associated with said output receiving means.

18. A system according to claim 15, wherein said at least two output generation devices are adaptable to be in an activated mode or a standby mode.

19. A system according to claim 18, wherein at least one of said at least two output generation devices is in an activated mode when an amount of output in one of said at least two storage system in fluid communication with said output generation device is at or below said predetermined minimum set point associated with said storage system.

20. A system according to claim 18, wherein at least one of said output generation devices is in a standby mode when an amount in said storage system in fluid communication with said output generation device is at or greater than said predetermined maximum set point associated with said storage system.

* * * * *